June 11, 1935. G. J. ABBOTT 2,004,548
MACHINE FOR CUTTING POTATOES OR OTHER OBJECTS INTO CHIPS OR SLICES
Filed June 13, 1932 3 Sheets-Sheet 1

Inventor
G. J. Abbott
By
Atty.

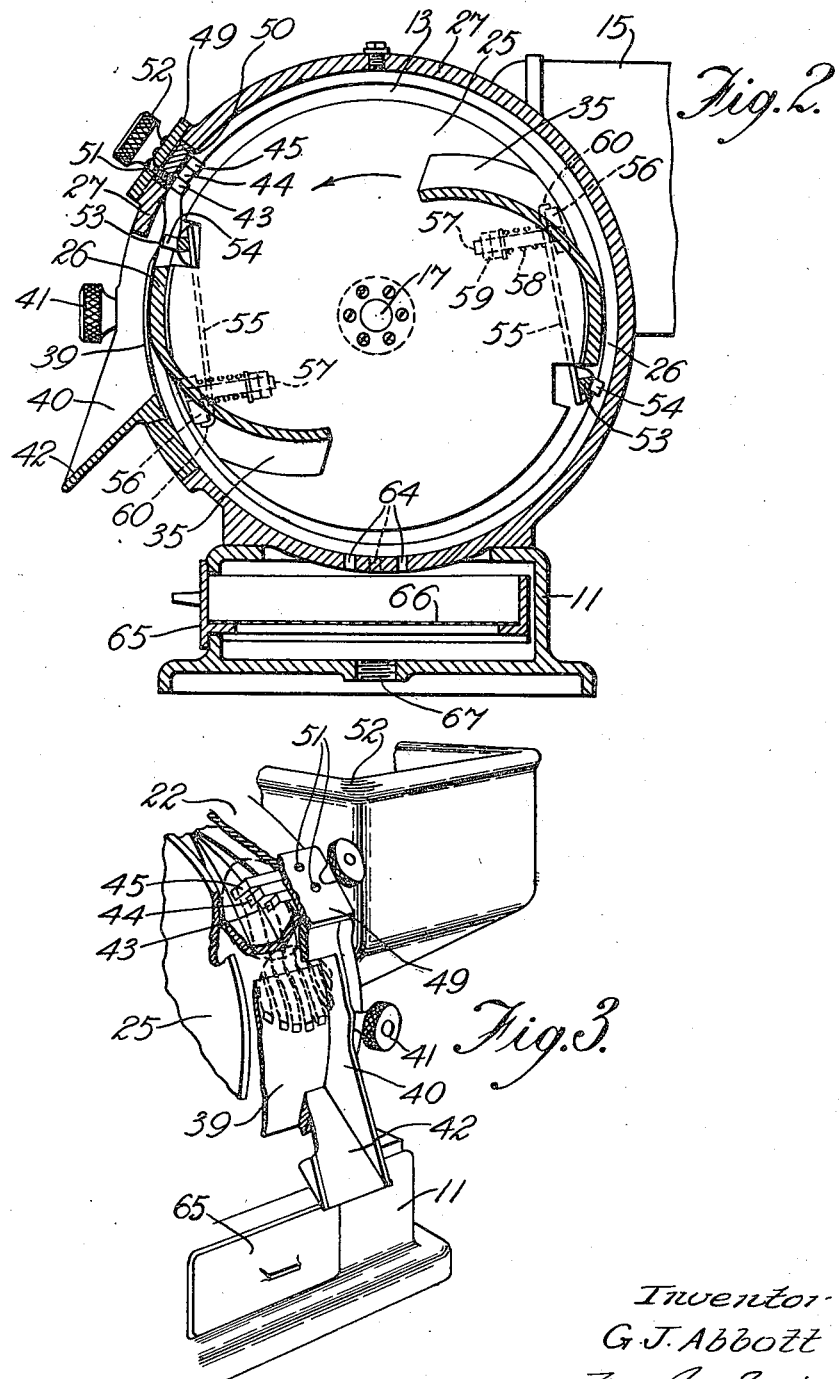

June 11, 1935.  G. J. ABBOTT  2,004,548
MACHINE FOR CUTTING POTATOES OR OTHER OBJECTS INTO CHIPS OR SLICES
Filed June 13, 1932  3 Sheets-Sheet 3
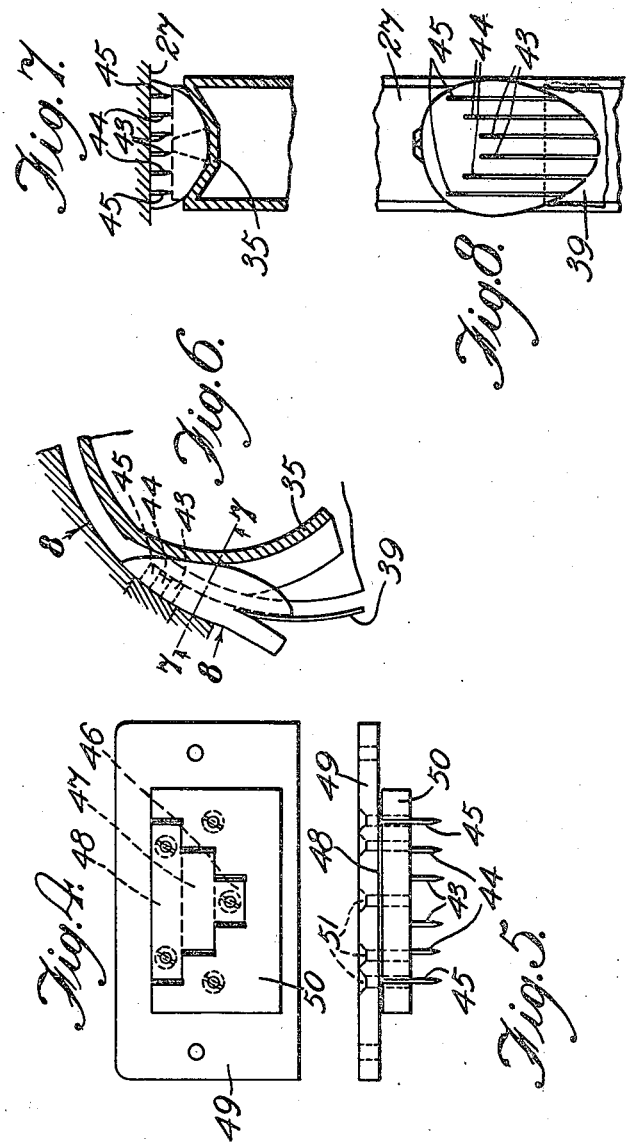
Inventor
G. J. Abbott Patented June 11, 1935

2,004,548

UNITED STATES PATENT OFFICE 2,004,548

MACHINE FOR CUTTING POTATOES OR OTHER OBJECTS INTO CHIPS OR SLICES

Geoffrey Joseph Abbott, London, England

Application June 13, 1932, Serial No. 617,013
In Great Britain June 29, 1931

8 Claims. (Cl. 146—166)

This invention relates to machines for cutting potatoes or other objects into chips or slices and has for an object to provide a machine which, whilst simple in operation, shall be capable of cutting such objects into slices or chips with little or no bruising or crushing and which will involve the minimum of handling of said objects.

According to the present invention, in a machine for cutting potatoes or other objects into slices or chips and having a rotary member and a stationary member, the rotary member has at least one channel-like passage or throat, of which the portion joining the two sides thereof converges from the outer end of the throat into which potatoes or other objects can be caused to enter, towards an approximately cylindrical circumferential wall of the stationary member which wall constitutes virtually the fourth side of the throat or each of them, the circumferential wall of the stationary member carrying adjacent to a discharge slot formed therein a knife or knives, so that when relative rotation between the members takes place, the knife or knives will cut from an object lying in the throat or any of them, pieces which will pass from the machine through the discharge slot.

Potatoes or other objects which are placed within a fixed casing can enter a throat therein as the said member rotates and will tend to pass towards the inner end of this throat so that an object which enters the throat will be carried round by this throat in contact with the circumferential wall and will be cut into slices by the knife or knives projecting inwardly from the circumferential wall.

The form of the throat may vary, but preferably it is of approximately triangular or part-circular cross-section in planes radial to, and containing the axis of rotation of, the rotary member, the circumferential wall forming one side of the triangle or a chord of the circle. Again, in order to retain the last pieces of a potato or other object in position in the throat, and thus to ensure these being cut or sliced by the knife or knives and discharged, a rake may be disposed adjacent to the inner end of the throat, the end of this rake lying adjacent to, or in contact with, the circumferential wall, means being provided for lifting the rake over the knife or knives.

The knife or knives may be arranged to cut chips or slices of various sizes, shapes or thicknesses, but where the machine is adapted to cut a potato or the like into chips, two or more knives are arranged in parallel planes normal to the axis of rotation of the rotating member so as to form a series of parallel slits in the adjacent face of the potato or the like, while a further knife is arranged to slice off the part or parts of the potato thus slit, whereby chips are produced. Further, in such an arrangement, the slitting knives are preferably staggered in relation to one another so that these knives enter the potato or the like successively, the slicing knife preferably being disposed so as to cut the potato after it has been slit by the slitting knives.

In any case where a slicing knife is employed, the edge of this knife may be inclined to planes normal to the axis of rotation of the rotary member so that the edge of this knife lies obliquely with respect to its direction of travel through the potato, whereby a clean cut is ensured. For example, where three or more slitting knives are provided in the manner described above, these slitting knives may be arranged in staggered formation with the outermost knives disposed so as to enter the potato or the like before the knife or knives lying between them, and the edge of the slicing knife may be V-shaped when viewed in a direction radially of the rotary member so that the distance of the end of each of the slitting knives from the adjacent part of the edge of the slicing knife is approximately the same, while an inclined cutting edge for the slicing knife is provided. With this arrangement, the slitting knives may be arranged so as to lie within the V formed by the two oppositely inclined edge portions of the slicing knife.

In some cases, the knife or knives may be adjustable or replaceable so as to enable these knives to be adjusted to produce chips or slices of different sizes or thicknesses, or to enable different arrangements of knives to be employed, so as to produce chips or slices of different shapes or thicknesses.

The invention is illustrated by the accompanying drawings, of which:—

Figure 2 is a sectional elevation on the line 2—2 of Figure 1;

Figure 3 is a fragmentary perspective view in which parts are broken away for the sake of clearness;

Figure 1:
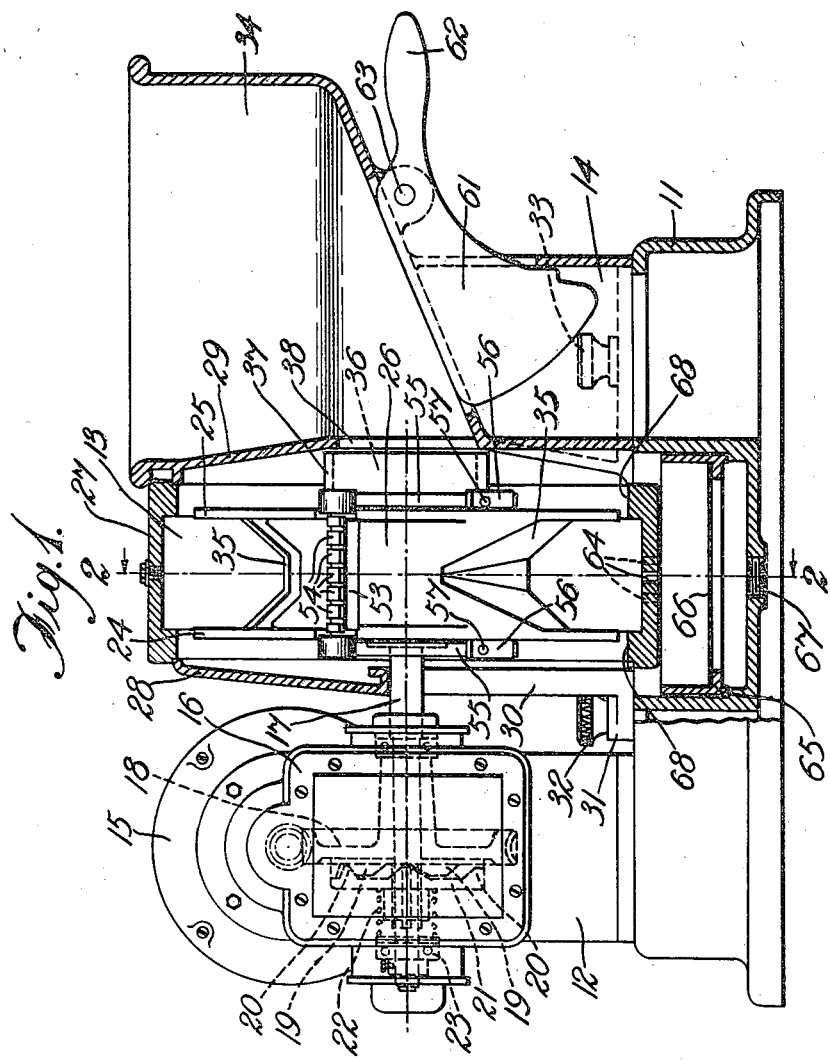
Figure 1 shows a power driven machine according to the invention, for cutting chips from potatoes, in part sectional side elevation.

Figures 4 and 5 are, respectively, face and edge views of slitting knives and a carrier thereof, whilst Figures 6, 7 and 8 are fragmentary sectional views, the section in Figure 6 being taken on the line 2—2 of Figure 1, that in Figure 7 on the line 7—7 of Figure 6, and that in Figure 8 on the line 8—8 of Figure 6.

As shown in Figure 1, the machine is assembled upon a cast base member 11, and comprises in addition thereto, three main parts, namely a drive section indicated at 12, a central section indicated at 13 where the actual slitting and slicing is effected, and a feed section indicated at 14. The drive section 12 includes an electric motor 15 and a gear box 16 having loose on the main shaft 17 of the machine a worm wheel 18 formed at one side with inclined dogs 19, which co-operate with complementary dogs 20 formed upon the contiguous face of a clutch member 21 in splined or equivalent connection with the shaft 17 and maintained in contact with the dogs 19 of the worm wheel 18 by means of a coiled compression spring 22 co-operating at its outer end with a thrust bearing 23. It will be observed, therefore, that in the event of the load on the shaft 17 exceeding a predetermined amount, slip between the worm wheel and clutch member 20 will be permitted according to the position on the shaft 17 in which the thrust bearing 23 is set.

At its free end, the shaft 17 carries the rotor of the machine. This rotor comprises two discs 24 and 25, the former of which is fast upon the main shaft 17 and is linked with the latter by cross members 26, as will be clear from a consideration of Figures 1 and 2 of the drawings.

The rotor of the machine is enclosed by a casing comprising a circumferential wall 27 and end plates 28 and 29. As will be seen, the circumferential portion 27 of the casing is carried directly by the base 11 of the machine, the end plate 28 being formed with a slot as indicated at 30 and being provided with lugs such as 31 at its lower end, so that it may readily be removed from position by undoing thumb nuts 32, shifting it laterally and then raising it clear of the machine. The other end plate 29 is adapted similarly to be secured in position upon the base plate of the machine by thumb nuts 33 and is formed integrally with a feed hopper 34.

As will be seen from Figures 1 and 2 of the drawings, each cross member 26 of the rotor of the machine projects from the peripheries of the discs 24 and 25 in order that when disposed to one side of the casing 27 (the left hand side as viewed in Figure 2) the outer face of the cross-member lies close to the inner face of said casing, and from one edge of each cross member 26 there extends between the two discs 24 and 25 a member 35 of progressively enlarging channel section which forms, together with the inner face of said casing 27, a passage or throat of which the cross sectional area decreases from the inner end of the member 35 to the outer end thereof where it joins the cross member 26. For the sake of clearness, these members 35 will hereinafter be referred to as throat members. In practice, the rotor, comprising the two discs 24 and 25, cross members 26 and throat members 35, will be formed integrally as a single casting; the disc 25 having a central opening 36 from which extends outwardly an annular flange 37, the internal diameter of which is substantially equal to the diameter of a delivery opening 38 of the hopper 34. Thus, potatoes placed within the hopper 34 will fall through the opening 36 into the casing 27 to be engaged by the throat members 35, as the rotor is rotated, and carried round in the casing pressed firmly against the inner wall of the latter. It will be observed from Figure 2, that the casing 27, or at least the inner surface thereof, is not truly cylindrical, for it comprises two semi-cylindrical surfaces, the lower of which is of smaller diameter than the upper, these surfaces merging into one another at one side (the right hand side of Figure 2) but being separated radially from one another at their opposite ends (at the left hand side of Figure 2). At that end of the wall of the casing 27 which is located nearer the spindle 17 than the other, there is mounted a slicing knife 39 which extends across the full width of the casing 27 and is carried by a readily detachable member 40 adapted to be secured in position by thumb nuts 41 and formed with a delivery chute 42. It will be seen, therefore, that an object such as a potato carried round against the inner face of the casing 27 by a throat member 35 will be brought to bear against the knife 39 in such manner that a layer of predetermined thickness will be sliced therefrom and fall from the machine via the delivery chute 42.

This knife 39 is all that is necessary where it is required merely to slice potatoes or other articles, but as the machine in question is intended for cutting such articles into chips, further slitting knives are provided on the outer wall of the casing in advance of the slicing knife 39. These slitting knives are indicated at 43, 44 and 45, and are shown more clearly in Figures 4, 5, 6, 7 and 8 of the drawings, from which it will be apparent that they are formed in pairs from lengths of strip metal indicated at 46, 47 and 48 respectively, each of which is bent to substantially U-shaped formation and formed with cutting edges at the ends thereof. These knives are secured to a carrier plate 49 by means of a composite plate 50, built up from two complementarily stepped pieces, secured to the inner face of the carrier plate 49 by screws 51 to leave between the steps thereof slots through which the end portions of the knives 43, 44 and 45 extend. As in the case of the member 40 carrying the slicing knife 39, this carrier plate 49 of the slitting knives 43, 44 and 45 is secured detachably to the casing 27 by thumb nuts 52 so that the slotted plate 50 engages in an appropriate opening in the wall of the casing 27 with its inner face flush with the inner surface of the latter and with the knives 43, 44 and 45, extending inwardly therefrom. It will be observed that these knives 43, 44 and 45 are arranged in substantially V-shaped formation so that only two of them at a time enter a potato carried round by a throat member 35, and in this way all possibility of the potato becoming jammed laterally in the machine is avoided; for, were all the knives 43, 44 and 45 to enter the potato simultaneously, the consequent lateral spreading thereof would result in the potato becoming wedged too tightly between a throat member and the wall of the casing 27. It will be noted that a potato is already gripped firmly between such throat member 35 and the casing 27 before the former carries it onto and over the knives 43, 44 and 45. The inner ends of the knives 43, 44 and 45 are distant from the centre of the rotor by an amount slightly less than the edge of the slicing knife 39 is distant from said centre, so that as a potato passes the knife 39, the portion thereof previously slit by the knives 43, 44 and 45 will be sliced therefrom by the knife 39 and thus chips will be produced. This operation will be clear from a perusal of Figures 3, 6, 7 and 8 of the drawings.

As a potato in a throat 35 has successive slit layers sliced therefrom, it will move further and further towards the smaller end of the throat member 35 and finally over the cross member 26 at that end thereof; and, with a view to ensuring that a such a thin piece of potato shall effectively be slit and discharged from the machine, the rotor is provided for each throat member 35 with what may be termed a rake member 53, prongs 54 of which are adapted to pass between the slitting knives 43, 44 and 45. Each rake member 53 is carried by two supporting arms 55 loosely secured pivotally to the discs 24 and 25 by means of lugs 56 extending from said discs 24 and 25 and carrying each a rigid pin 57 which extends loosely through an opening in the corresponding supporting arm 55 and has threaded thereover a coiled compression spring 58, the pressure exerted by which, upon the supporting arm 55 tends to cause the arms 55 and the rake 53 carried thereby to move outwardly away from the centre of the rotor and is adjustable by means of nuts 59 on the threaded free end portion of the pin 57. At its pivoted end, each supporting arm 55 is turned over to co-operate with the corresponding lug 56 as indicated at 60. It will be seen that by the springs 58, each rake 53 is urged outwardly so that the ends thereof will bear against the shoulders 68 extending around the casing 27 at each side thereof and are of such dimensions that when the rake 53 bears thereagainst, the prongs 54 of the rake will extend close to the inner surface of the casing 27 but not actually contact therewith. These shoulders 68 serve as a cam for controlling the distance of the rake 53 from the axis of the rotor and it will be observed, from the left hand half of Figure 2, that just after the rake 53 has passed the slitting knives 43, 44 and 45, it is moved inwardly by the shoulders 68 so that the prongs 54 thereof clear the slicing knife 39.

With a view to preventing any bridging of potatoes which may occur across the opening 38 of the hopper 34 and prevent the passage of potatoes into the casing 27, there is provided at the bottom of the hopper a weighted member 61 which tends under the influence of gravity to assume the position shown, but which may be moved by the handle 62 about a pivotal mounting 63, to disturb the potatoes at the bottom of the hopper 34.

For the removal of any small pieces of potato or liquid from the casing 27, the latter is formed at the lower part thereof with a number of outlets 64; and within the base 11 of the machine, there is mounted a sliding drawer 65, the bottom of which is comprised by a layer of gauze or other foraminous material so that any liquid may pass therethrough to drain away through an outlet orifice 67 in the base 11, any solid matter collecting in the drawer 65 for subsequent removal.

In order that chips or slices of different sizes may be cut by a machine according to the invention, such a machine may be provided with a number of different sets of slicing and/or slitting knives.

It will be observed that a potato entering a throat member with its longer axis lying across the throat is far less likely to be retained therein than if it be disposed with its longer axis longitudinally of the throat; and in practice it is found that there is a tendency for a potato entering a throat member with its longer axis lying thereacross to fall as the rotary member rotates from the throat back into the base of the casing to be then picked up again by the throat and if its longer axis extend then longitudinally of the throat it will be effectively retained therein. In order to ensure that this tendency shall occur even with small potatoes, there may, in some cases, be provided two light leaf springs (not shown) mounted at opposite sides of the throat so as to bear on any potato or other object smaller than a certain size which enters the throat and to position it with its longer axis extending longitudinally of the latter.

What I claim is:—

1. In a machine for cutting potatoes into chips, a stationary hollow cylindrical part, cutting blades carried thereby and projecting inwardly thereof; a rotor operative within the cylindrical part, throats carried by the rotor and cooperating with the cylindrical wall of the cylindrical part to form a pocket to pick up potatoes from the lower portion of the cylindrical part and carry them into cooperation with the blades, the throats being formed to retain and present to the blades potatoes picked up by the throats in the direction of their longitudinal axes, a rake carried by the rotor and operating to hold the last remaining portion of the potato in operative position within the throat, and means for moving the rake radially of the rotor to avoid contact with the blades.

2. In a machine for cutting potatoes, a stationary cylindrical casing, means for delivering potatoes into the lower portion thereof, a rotor within the casing comprising spaced disks, bars connecting the disks parallel to the axis of the rotor, throats carried by said bars and extending toward the axis of the rotor, said throats converging toward the bars, and a knife carried by the casing.

3. A machine for cutting potatoes into chips including a fixed casing, into the lower portion of which the potatoes are delivered, a rotor operative within the casing, potato-carrying throats secured to and movable with the rotor, the throats converging toward the periphery of the rotor, a slicing knife carried by the casing to which the potatoes held by the throats are presented, slitting knives carried by the casing, and rakes carried by the rotor and cooperating with the potatoes in the throats, said rakes being divided to pass between the slitting knives.

4. A machine for cutting potatoes into chips including a fixed casing, into the lower portion of which the potatoes are delivered, a rotor operative within the casing, potato-carrying throats secured to and movable with the rotor, the throats converging toward the periphery of the rotor, a slicing knife carried by the casing to which the potatoes held by the throats are presented, slitting knives carried by the casing, rakes carried by the rotor and cooperating with the potatoes in the throats, said rakes being divided to pass between the slitting knives, and means for bodily moving the rakes to avoid the slicing knife.

5. A machine for cutting potatoes into chips or the like including a stationary cylindrical part, blades carried thereby, a rotor operative within the cylindrical part, and throats carried by the rotor, said throats having a leading end spaced from the cylindrical part to receive potatoes from the bottom of the cylindrical part in the movement of the rotor, the throats gradually converging relative to the cylindrical part from the leading end to the trailing end, each throat including side walls to position the potato within the throat and provide means for preventing a potato having its major axis longitudinally of the throat from rolling therefrom during the carrying of the potato in the throat, the said walls supporting a potato received in the throat with its major axis transverse the throat to permit a rolling contact between the potato and throat for the discharge of such potato from the throat before reaching the blades.

6. In a machine for cutting potatoes into chips, a stationary hollow cylindrical part, cutting blades carried thereby and projecting inwardly thereof, a rotor operative within the cylindrical part, and throats carried by the rotor and cooperating with the cylindrical wall of the cylindrical part to form a pocket to pick up potatoes from the lower portion of the cylindrical part and carry them into cooperation with the blades, the throats being open at their leading ends remote from the cylindrical part and closed at their trailing ends adjacent the cylindrical part and presenting a pocket gradually reduced in area longitudinally and transversely of the throats, each of said throats including converging side walls and a connecting bottom wall.

7. In a machine for cutting potatoes into chips, a stationary hollow cylindrical part, cutting blades carried thereby and projecting inwardly thereof, a rotor operative within the cylindrical part, and throats carried by the rotor and cooperating with the cylindrical wall of the cylindrical part to form a pocket to pick up potatoes from the lower portion of the cylindrical part and carry them into cooperation with the blades, the throats being open at their leading ends remote from the cylindrical part and closed at their trailing ends adjacent the cylindrical part and presenting a pocket gradually reduced in area longitudinally and transversely of the throats, each of said throats including converging side walls and a bottom wall having its leading edge inwardly of the rotor and its trailing edge merging substantially into the peripheral edge of the rotor.

8. In a machine for cutting potatoes into chips, a stationary hollow substantially cylindrical casing formed at its curved wall with an outlet for chips, slitting and slicing knives carried by the casing and projecting inwardly thereof, means for delivering potatoes into the lower portion of the casing, a rotor mounted to rotate in said casing about an axis substantially coincident with that of the casing and including coaxially spaced disks, a cross member parallel with the axis of the rotor joining the disks at the peripheries thereof, and a throat between said disks and converging toward the peripheries of the latter to merge at one end into said cross member.

GEOFFREY JOSEPH ABBOTT.